US007293422B2

(12) United States Patent
Parachini et al.

(10) Patent No.: US 7,293,422 B2
(45) Date of Patent: Nov. 13, 2007

(54) REFRIGERATOR WITH INTERNAL COMPARTMENT DIVISIBLE INTO INDEPENDENT TEMPERATURE ZONES

(75) Inventors: Davide Parachini, Varallo Pombia (IT); Matteo Santinato, Albignasego (IT); Davide Braggion, Besozzo (IT); Riccardo Allera, Laveno Monbello (IT)

(73) Assignee: Whirlpool Corporation, Benton Harbor, MI (US)

( * ) Notice: Subject to any disclaimer, the term of this patent is extended or adjusted under 35 U.S.C. 154(b) by 378 days.

(21) Appl. No.: 10/757,890

(22) Filed: Jan. 15, 2004

(65) Prior Publication Data

US 2004/0148949 A1 Aug. 5, 2004

(30) Foreign Application Priority Data

Jan. 21, 2003 (EP) ................................ 03001239

(51) Int. Cl.
*F25B 49/00* (2006.01)
*G01K 13/00* (2006.01)

(52) U.S. Cl. ............................ 62/126; 62/129; 62/130

(58) Field of Classification Search .................. 62/125, 62/126, 127, 129, 130, 298, 329, 176.6
See application file for complete search history.

(56) References Cited

U.S. PATENT DOCUMENTS

| | | | | |
|---|---|---|---|---|
| 3,708,997 | A * | 1/1973 | McLaughlin | 62/298 |
| 4,509,335 | A * | 4/1985 | Griffin et al. | 62/298 |
| 4,876,860 | A * | 10/1989 | Negishi | 62/329 |
| 5,033,272 | A * | 7/1991 | Yoshikawa et al. | 62/208 |
| 5,502,979 | A * | 4/1996 | Renard | 62/298 |
| 6,601,394 | B2 * | 8/2003 | Tatter | 62/127 |

* cited by examiner

*Primary Examiner*—Chen Wen Jiang
(74) *Attorney, Agent, or Firm*—Michael D. Lafrenz; Kirk Goodwin

(57) ABSTRACT

A refrigerator having a removable shelf with a user interface for setting the working conditions of a refrigerator compartment. The user interface also being able to transmit the working conditions to a control unit of the refrigerator. The refrigerator having a package to be inserted in the refrigeration compartment, the package supporting a plurality of inductors for receiving and transmitting data to the user interface.

14 Claims, 2 Drawing Sheets

REFRIGERATOR WITH INTERNAL COMPARTMENT DIVISIBLE INTO INDEPENDENT TEMPERATURE ZONES

BACKGROUND OF THE INVENTION

1. Field of the Invention

The present invention relates to a refrigerator in which zones at mutually independent temperatures can be obtained and in which inductors associated with the refrigerator compartment corresponding to the shelves can be easily installed and replaced.

2. Description of the Related Art

As is well known, in a refrigerator (static or no-frost) it is very important to achieve a correct temperature in each of its preservation or freezing compartments in order to obtain optimum preservation of foods stored in it. In particular, different foods storable in the compartment for preservation may require different preservation temperatures, as for example the case of meat and fish compared with vegetables or dairy products.

To achieve different preservation temperatures, it is known to use a shelf in the refrigeration compartment for dividing the compartment into two or more zones having different temperatures. Such a shelf may be provided with an electronic control circuit for setting the temperature in the portion of the compartment above the shelf, without the need of using any cable or plug-socket connection since the transmission of data, as the power transmission to the electronic circuit of the shelf, could be carried out by inductors placed on the shelf and fixed in the wall of the refrigerator respectively.

To have an inductor or an antenna embedded in the insulated wall of a refrigerator has some drawbacks since the production cycle of the refrigerator has to be modified. Moreover in case of failure of one or more embedded inductors or related electronic circuits, it is impossible to replace the defective component. Accordingly, it would be advantageous to provide a refrigerator where the inductors can be easily removed and replaced.

SUMMARY OF THE INVENTION

An object of the present invention is to provide a refrigerator in which zones at mutually independent temperatures can be obtained and in which the inductors or antennas associated with the refrigerator compartments and cooperating with corresponding inductors of the electronic circuit of the shelves can be easily installed and replaced in case of failure thereof.

Another object is to provide a refrigerator of the above type in which the shelves can provide a feedback to the user as far as the set and actual conditions in the refrigeration compartment or portion thereof are concerned.

These and further objects which will be apparent to the expert of the art are attained by a refrigerator in accordance with the accompanying claims.

BRIEF DESCRIPTION OF THE DRAWINGS

The present invention will be more apparent from the accompanying drawings, which are provided by way of non-limiting example and in which.

DETAILED DESCRIPTION

Figure 1:
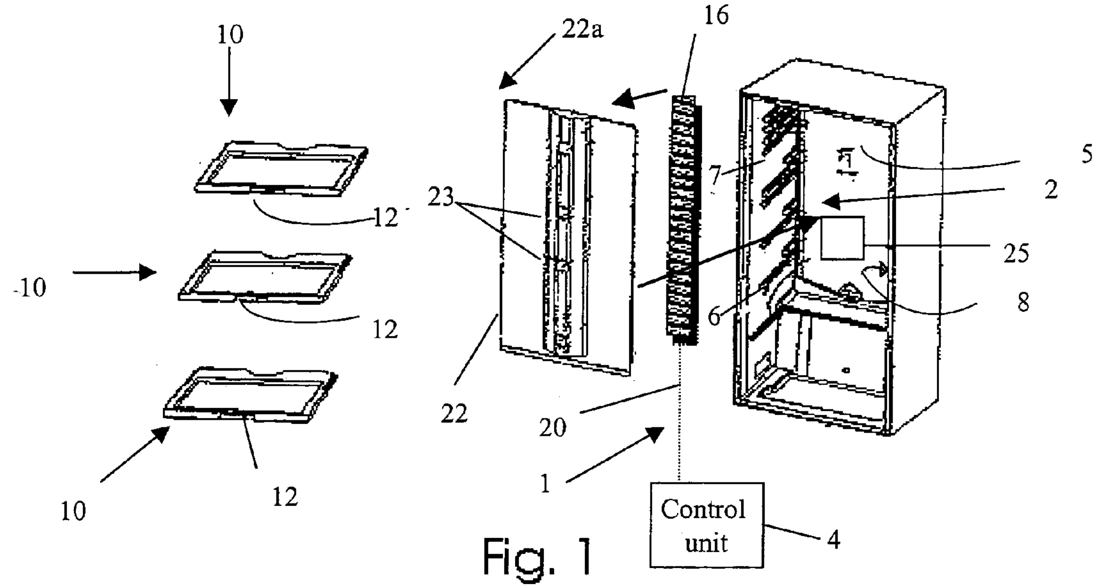
FIG. 1 is an exploded and schematic perspective view of a refrigerator according to the invention.

With reference to FIG. 1, an upright refrigerator 1 comprises an internal compartment 2 having a rear wall 5. Usual supports 6 are present on the lateral walls 7,8 to support shelves 10.

Each shelf 10 comprises a user interface 12 for allowing the internal temperature of the compartment 2 (or a temperature range corresponding to a determined food category) to be set and to be measured. These user interfaces 12 are configured to cooperate with a control unit 4 of the refrigerator 1 for controlling the operation of each shelf 10 on the basis of the temperature or humidity setting selected by the user.

Figure 2:
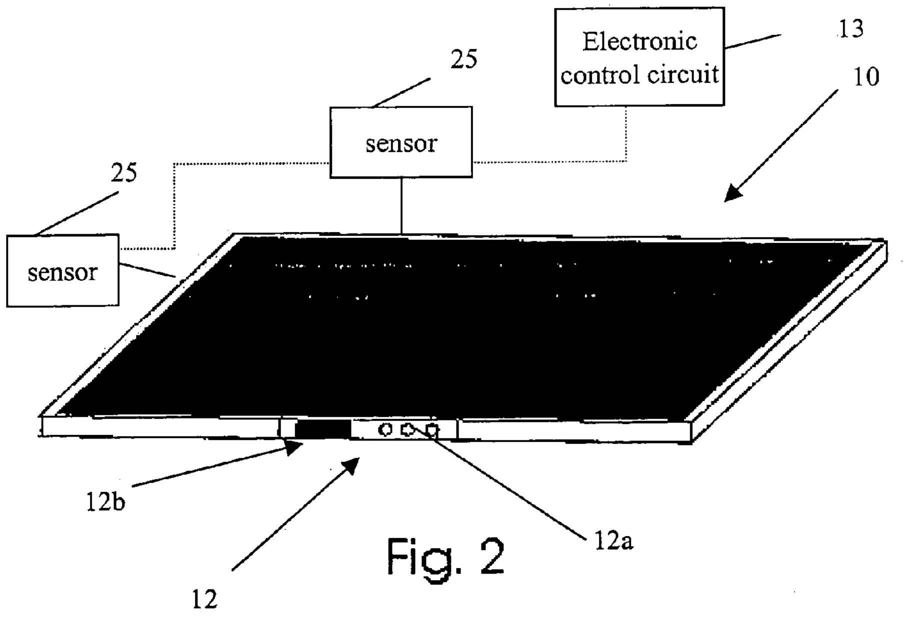
FIG. 2 is a schematic front perspective view of a shelf used in the refrigerator according to the invention.

Each user interface 12 is preferably positioned on a front edge of each shelf 10 as shown in FIG. 2, for independent control of each shelf. Each user interface 12 preferably comprises an electrical and/or electronic control circuit 13 suitably inserted into the shelf 10, for example an electrical circuit of passive type defined by an RLC resonant circuit and comprising an inductor positioned in correspondence with a rear edge of the shelf a plurality of capacitors of various capacitances. Each capacitor is connected on one side to an electrical line connected to one end of the inductor, and on the other side to a change over switch arranged to connect each capacitor to a second electrical line, connected to an electrical branch connected to the other end of the inductor.

With reference to FIG. 2, it is contemplated that the user interface 12 presents buttons 12*a* for setting physical characteristics, like temperature or humidity, in the refrigerator compartment, and preferably in the portion of such compartment above the shelf. The user interface 12 may also have a display 12*b* for showing the temperature or humidity set by the user or the temperature actually present in the compartment.

The display 12*b* could also give indications about food contained in the sub-volume such as smell, weight or gas emission, and such indications could be provided by the shelf to the control unit 4 of the refrigerator as well. The input device of the user interface 12, instead of buttons 12*a*, could include switches, electromagnetic sensors, reed switches activated by magnets on the shelf or other known input devices.

For example a slider with a small magnet could be moved on the front side of the shelves 10, closing or opening one or more reed switches. The information obtained from the reed switches could then be used to set the temperature of the sub-volume above the removable shelf. In another example some capacitive touch sensors could be placed on the shelf user interface 12 and used to detect customer touch. The status of the sensor could be continuously checked, and detection of a touch could then used to set the temperature of the sub-volume above the removable shelf.

The display 12*b* of the shelf can give a feedback to the user about data relative to actual physical characteristics of the sub-volume such as temperature, humidity, temperature gap with a set temperature or to characteristics of the food placed in the sub-volume. In order to provide the above feedback each shelf 10 can be provided with one or more specific sensors in communication with the electric control circuit 13. Feedback may be provided in an optical way (using a light, display, LED) or in an acoustical way. Information content could be associated with a color or color variation, a numerical or alphanumerical indication, an iconic indication, or a particular sound or sound combination.

The information attributable to each shelf or sub-volume could be delivered to the refrigerator by means of an electromagnetical signal, generated from an analog circuit or from a digital device being part of the circuit 13 of the shelf 10.

The signal may contain data in numerical form, or data that is associated to a signal peculiarity, like frequency, phase or amplitude. After generation, the signal that is modulated with a modulation scheme, amplified and transferred to the antenna section, where an electromagnetic wave is generated.

An information coming from the refrigerator control circuit can be received by the same antenna section, and then demoduated and transferred to an analog or digital circuit. The retrieved data are elaborated and the feedback elements are then controlled in the most appropriate form.

The power for electronic parts on the shelves 10 is obtained from a low frequency signal generated in the refrigerator. This signal is filtered, charging some energy storing elements like a capacitor, and a continuous like voltage is obtained to supply circuitry. As an alternative solution batteries or accumulators can be used to provide power at the shelf electronic circuits.

Figure 3:
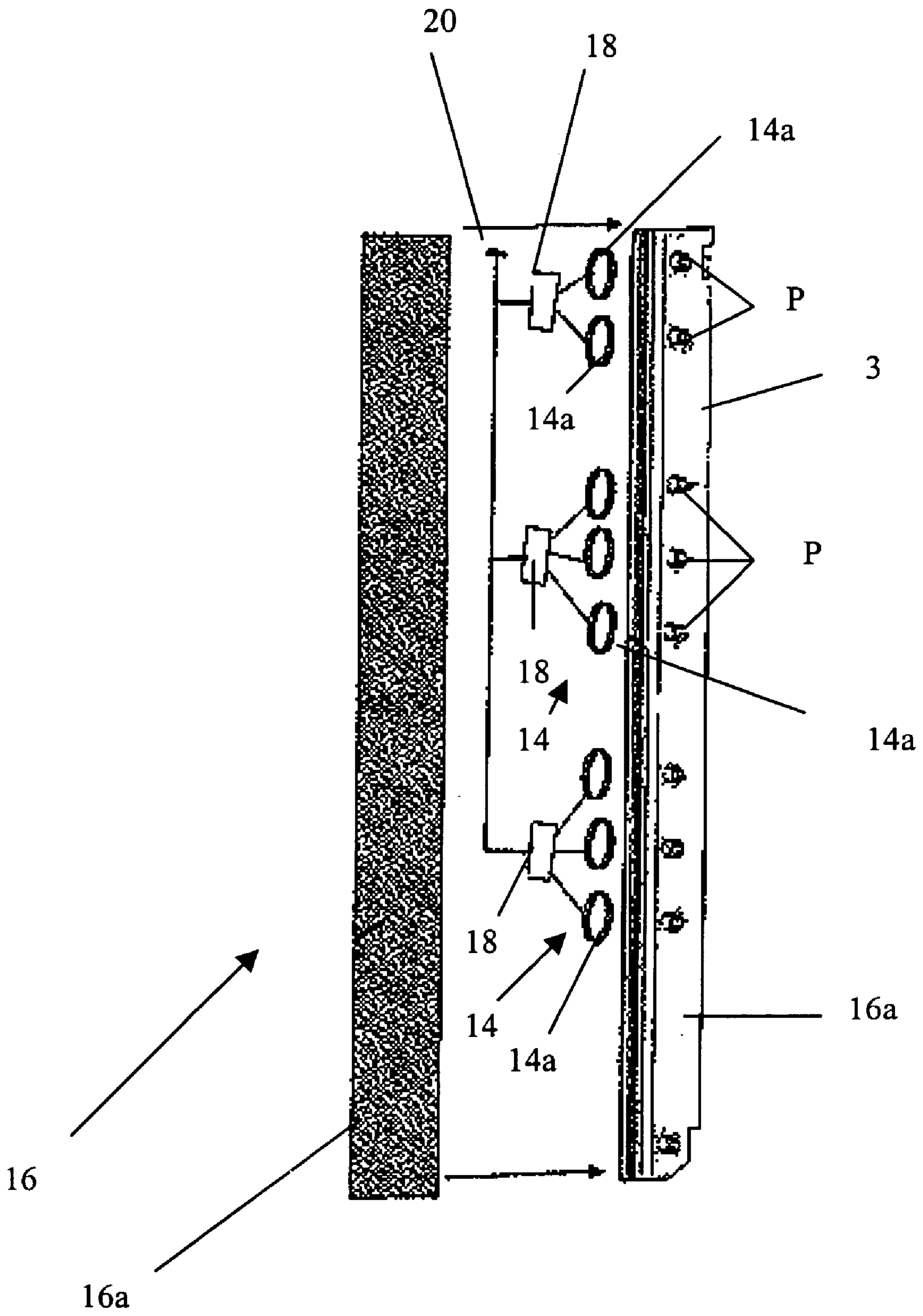
FIG. 3 is an exploded perspective view of a component of the refrigerator according to the invention.

FIG. 1 and specifically to FIG. 3 depict a package 16 comprising a plurality of antennas 14 for sending and receiving data from a shelf 10. Each antenna 14 is part of a resonant circuit having one or more inductors 14*a*, placed in series or in parallel.

Each of the inductors 14*a* couples with the antenna of the respective shelf only when the shelf 10 is placed in the position close to the inductor 14*a* (the shelf have some fixed positions).

The data transmitted from the shelf 10 can be digitalized and sent to the control unit 4 of the refrigerator. Each of the antenna 14 can also used to transmit the carrier signal to the shelf's circuits 13 and to send data via a carrier superimposed signal.

The package 16 comprises a plastic flat support 3 having a plurality of protrusions P, on which inductors 14*a* are inserted. In one embodiment, the inductors 14*a* are then connected to a local electronic circuit 18 which generates a carrier signal and demodulates the signal received from the shelf 10, giving a digital signal as output. The signals from all the electronic circuits 18 are then collected through a connector 20 connected to the control unit 4 of the refrigerator. A second plastic part 16*b* covers the inductors 14*a*, by forming a complete package 16 antenna system. The complete package 16 can be then assembled to a rear surface 22*a* of a removable wall or panel 22 to be mounted inside the cavity of the refrigerator 1 (FIG. 1). The wall or panel 22 can be of the same polymeric material of the refrigerator liner, so that the user sees it as the back wall of the cavity.

In an alternative implementation only inductors 14*a* are packaged (no local electronical circuit 18 is provided), and the terminals are connected with a connector 20 to the control system 4 of the refrigerator.

The package 16 is mechanically fixed to the back surface 22*a* of the removable panel 22 of the refrigerator 1 as described in FIG. 1, by means of plastic clips, using and adhesive layer or with screw. The panel 22 can then be removably fixed in front of the refrigerator cavity back wall 5. In an alternative solution (not shown in the drawings), the box-like package 16 can be replaced by an adhesive strip having the coils 14*a* fixed therein.

The technical solution according to the invention is particularly useful in a refrigerator where a volume is defined between the back wall 5 of the cavity and the removable wall 22, such volume being used for placing an evaporator of the refrigeration circuit. This means that it is not necessary to have another added component to be inserted in the cavity 2, since it can be exploited an already existing component used for thermodynamic purposes.

According to such solution, apertures 23 are provided in the removable wall or panel 22, some of these apertures 23 being provided with fans for assuring an exchange of air between the compartment 2 and the volume in which the evaporator 25 is placed.

Of course the technical solution according to the invention can be used also for traditional refrigerators; in this case the removable wall 22 will be installed closer to the back wall of the cavity. Moreover, the position of the removable panel 22 can be different, for instance it can be placed on a sidewall of cavity 2.

We claim:

1. A refrigerator comprising:

a refrigerator compartment having a rear wall;

a control unit:

at least one removable food support element positioned within the refrigerator compartment and having a user interface for setting the working conditions of at least a portion of the refrigerator compartment and for transferring the working conditions to the control unit; and an antenna package configured to be removably inserted in the refrigerator compartment, the antenna package comprising at least one antenna for receiving and transmitting data from the control unit to the user interface.

2. The refrigerator according to claim 1, wherein the package is removable and faces the rear wall of the refrigeration compartment.

3. The refrigerator according to claim 2, wherein the package comprises at least some of the electronic components associated to the plurality of inductors.

4. The refrigerator according to claim 1, wherein each removable food support element comprises a display for providing the user with a feedback on the conditions set in the refrigerator compartment.

5. The refrigerator according to claim 1, wherein each removable food support element comprises one or more sensors for providing the user and the control unit of the refrigerator with a feedback on the actual conditions in the refrigerator compartment.

6. The refrigerator according to claim 5, wherein the one or more sensors associated with each support element are adapted to provide a signal indicative of characteristics of food placed in the refrigerator compartment or portion thereof.

7. The refrigerator according to claim 1, wherein each user interface is adapted to set temperature and humidity.

8. The refrigerator according to claim 1, wherein the at least one antenna comprises at least one inductor.

9. The refrigerator according to claim 1, wherein the antenna package comprises multiple antennas.

10. The refrigerator according to claim 9, wherein each of the multiple antennas comprises an inductor.

11. The refrigerator according to claim 1, and further comprising multiple removable food support elements.

12. The refrigerator according to claim 1, and further comprises a panel inserted in the refrigerator compartment in front of the rear wall to define a volume therebetween in which the antenna package is received.

13. The refrigerator according to claim 12, wherein an evaporator is placed between the panel and the rear wall of the refrigerator.

14. The refrigerator according to claim 13, wherein a plurality of apertures are provided in the panel for allowing airflow to the evaporator.

* * * * *